United States Patent [19]

Urbanski

[11] 4,192,209

[45] Mar. 11, 1980

[54] HYDRAULICALLY ACTUATED CUTTING AND PUNCHING ASSEMBLY

[75] Inventor: Edward F. Urbanski, Abington, Pa.

[73] Assignee: P-W Industries, Inc., Cornwells Heights, Pa.

[21] Appl. No.: 942,614

[22] Filed: Sep. 15, 1978

[51] Int. Cl.² ............................................ B26D 5/08
[52] U.S. Cl. .......................................... 83/564; 83/639
[58] Field of Search ............... 83/564, 639, 566, 563, 83/694, 679, 693

[56] References Cited

U.S. PATENT DOCUMENTS

| Re. 10,547 | 12/1884 | Dwyer | 83/564 |
|---|---|---|---|
| 423,119 | 3/1890 | Breuer | 83/564 X |
| 2,384,130 | 9/1945 | Pell et al. | 83/564 |
| 3,302,504 | 2/1967 | Fisher | 83/564 |
| 3,528,332 | 9/1970 | Thumin | 83/564 X |

*Primary Examiner*—Donald R. Schran
*Attorney, Agent, or Firm*—Frailey & Ratner

[57] ABSTRACT

A hydraulically actuated assembly for cutting and punching channels having a base section and an upper hydraulically operated section which is pivotally secured to the base section. The upper section has first and second side plate members spaced from each other to define the front and rear walls of a cutting and punching chamber. These plate members have upper recesses which receive a mounting member rigidly secured thereto to form a rigid support structure for a hydraulic cylinder and the cutting and punching operation.

5 Claims, 8 Drawing Figures

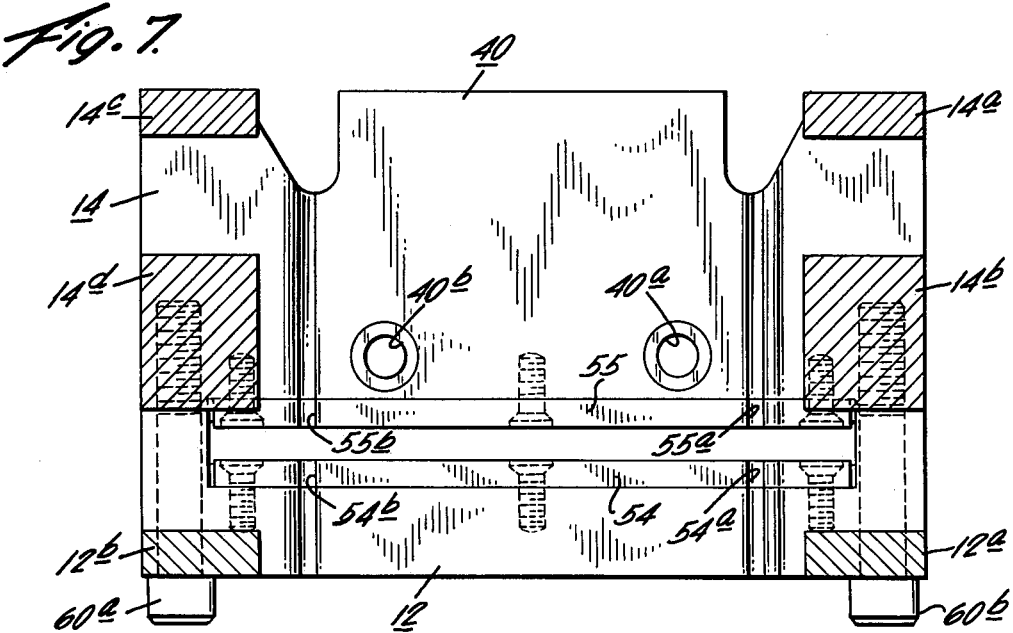
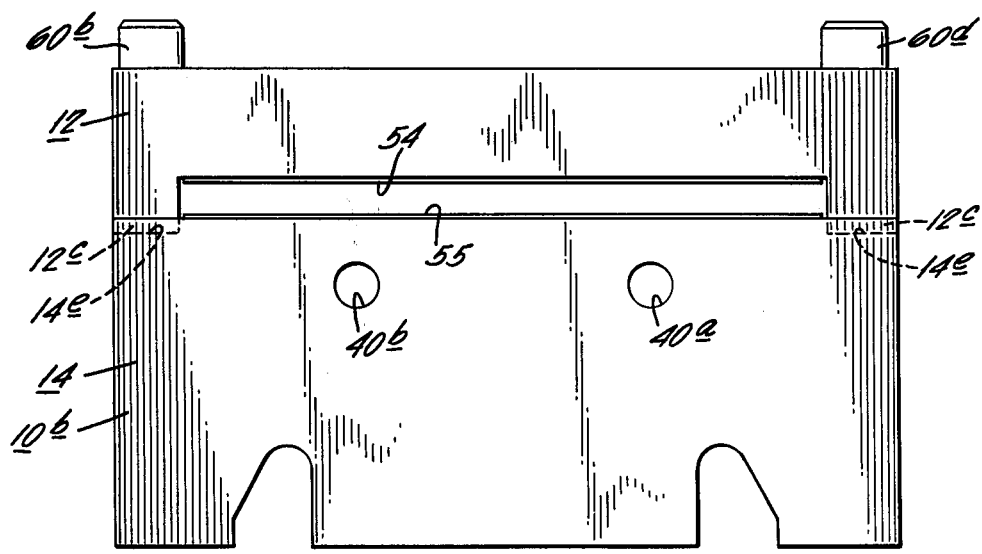

HYDRAULICALLY ACTUATED CUTTING AND PUNCHING ASSEMBLY

BACKGROUND OF THE INVENTION

A. Field of the Invention

This invention relates to the field of art of hydraulically actuated cutting and punching.

B. Prior Art

Large industrial size presses are known which both cut and punch structural members such as cable tray channels and rungs. Cable trays are used for supporting electrical cables and control circuits in applications such as nuclear plants, electrical generating plants and other industrial plants. Cable trays comprise two opposing channels with support members or rungs disposed at predetermined intervals between the channels. In practice, cable trays are usually cut and punched in the field at the site of the generating plant where the cable trays are actually being installed. It is only at the time of field installation that the exact lengths of cable tray sections are known. Large industrial sized nonportable presses for cutting and punching the cable trays are not suitable for use in the field and therefore, the cutting and punching operations have been performed manually by saw and drill. While portable punches have been known to punch one or more holes in metal structural members, punches have left much to be desired in combining both cutting and punching as well as providing a rigid support structure. The rigidity of the support structure for the hydraulic cylinder and for the cutting and punching operation is a critical problem since a portable punch must be greatly reduced in size and weight. Further, the entire assembly must have a simple means to allow for the entrance of the work piece or cable tray. Without a rigid support structure, prior assemblies have not precisely maintained cutting and punching alignment resulting in undesirable shearing, thereby causing unacceptable burrs as well as other problems.

SUMMARY OF THE INVENTION

A hydraulically actuated assembly for cutting and punching channels which comprises a base section and an upper hydraulically operated section pivotally secured to the base section. The upper section has a first and a second member spaced from each other which define front and rear walls of a cutting and punching chamber. The first and second members have upper recesses which face each other and a mounting member which forms an upper wall of the chamber is rigidly secured within the recesses. In this manner, there is formed a rigid support structure for a hydraulic cylinder and for the cutting and punching operation. Cutting and punching means is secured to the hydraulic cylinder for providing the cutting and punching of the channel within the chamber.

BRIEF DESCRIPTION OF THE DRAWINGS

FIG. 7 is a sectional plane view taken on lines 7—7 of FIG. 4; and

FIG. 8 is a bottom plan view taken on lines 8—8 of FIG. 4.

DETAILED DESCRIPTION

Figure 1:
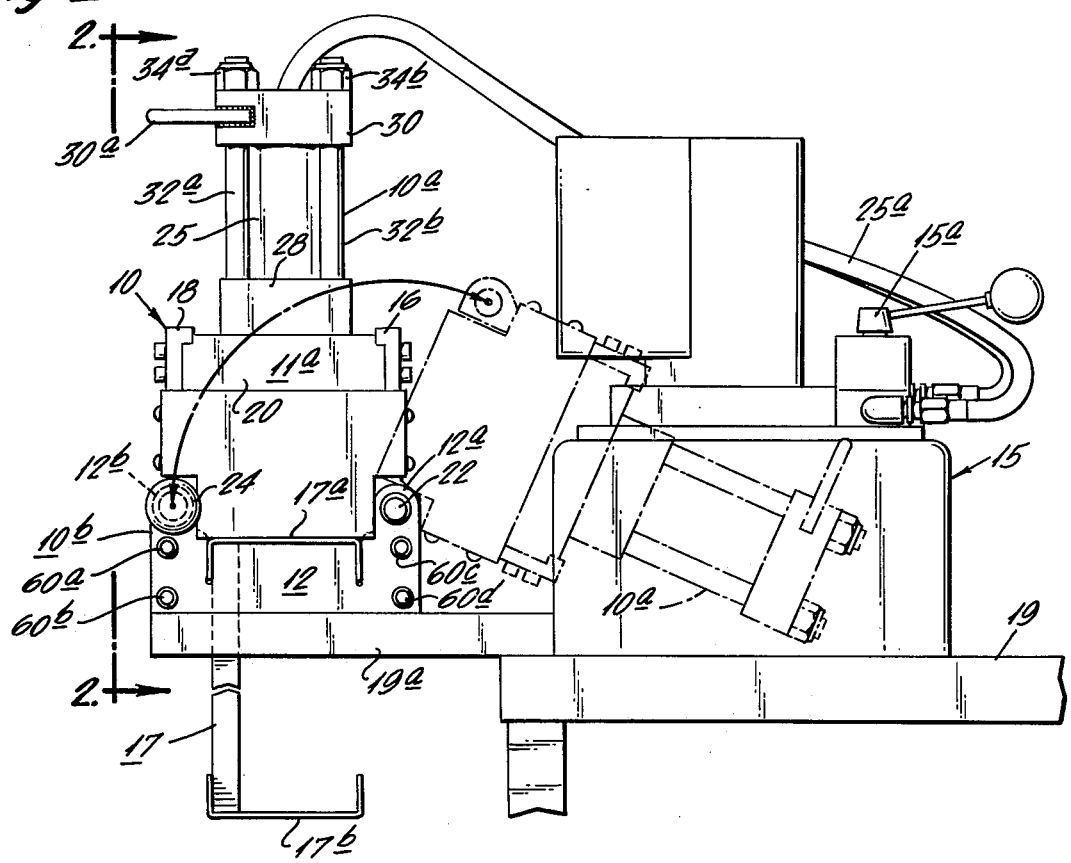
FIG. 1 is a right side elevational view of a hydraulic cutter and punch assembly with associated pump and control valve assembly showing in dash lines the open hinge position of the cutter and punch assembly in accordance with the invention.
Figure 2:
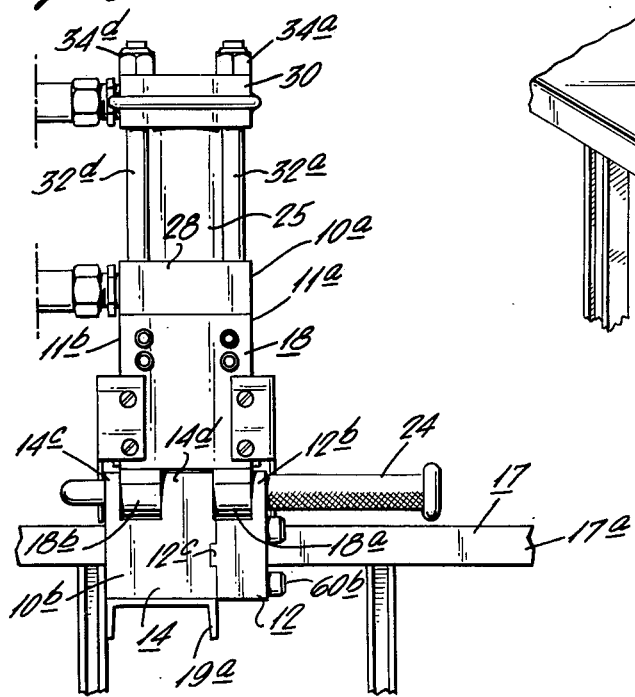
FIG. 2 is a front elevational view taken on lines 2—2 of FIG. 1 showing the front or operator's loading side of the cutter and punch assembly of FIG. 1.
Figure 3:
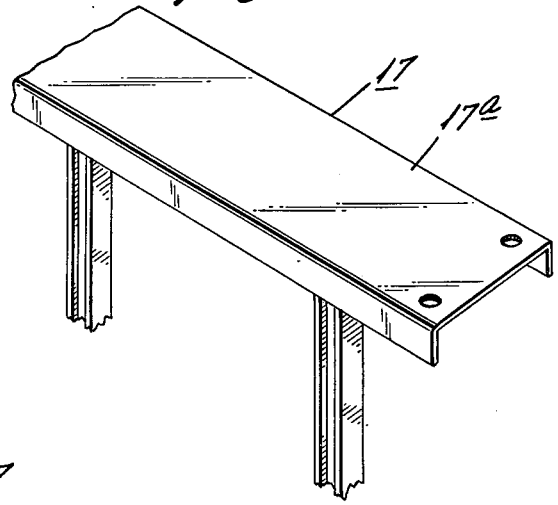
FIG. 3 is a fragmentary perspective view of a cable tray showing a cut and punch channel.

Referring now to FIGS. 1-3, there is shown a portable and reduced size hydraulic cutter and punch assembly 10 which is particularly designed and adapted to cut and punch a cable tray 17 in the field. Assembly 10 has an upper rotatable section 10a and has its base section 10b rigidly mounted to a channel 19a fixed to a table 19. The table also supports a conventional hydraulic pump and control valve assembly 15 which provides fluid under pressure to assembly 10. As shown in FIGS. 2,4-8 assembly 10 has base section 10b formed of a first base member 12 and a second base member 14 which are rigidly secured together. First base member 12 has a male member or key 12c which is received within a groove 14e of second base member 14. Bolts 60a–d are effective to bolt members 12-14 together to provide a secure a base section 10b.

Figure 5:
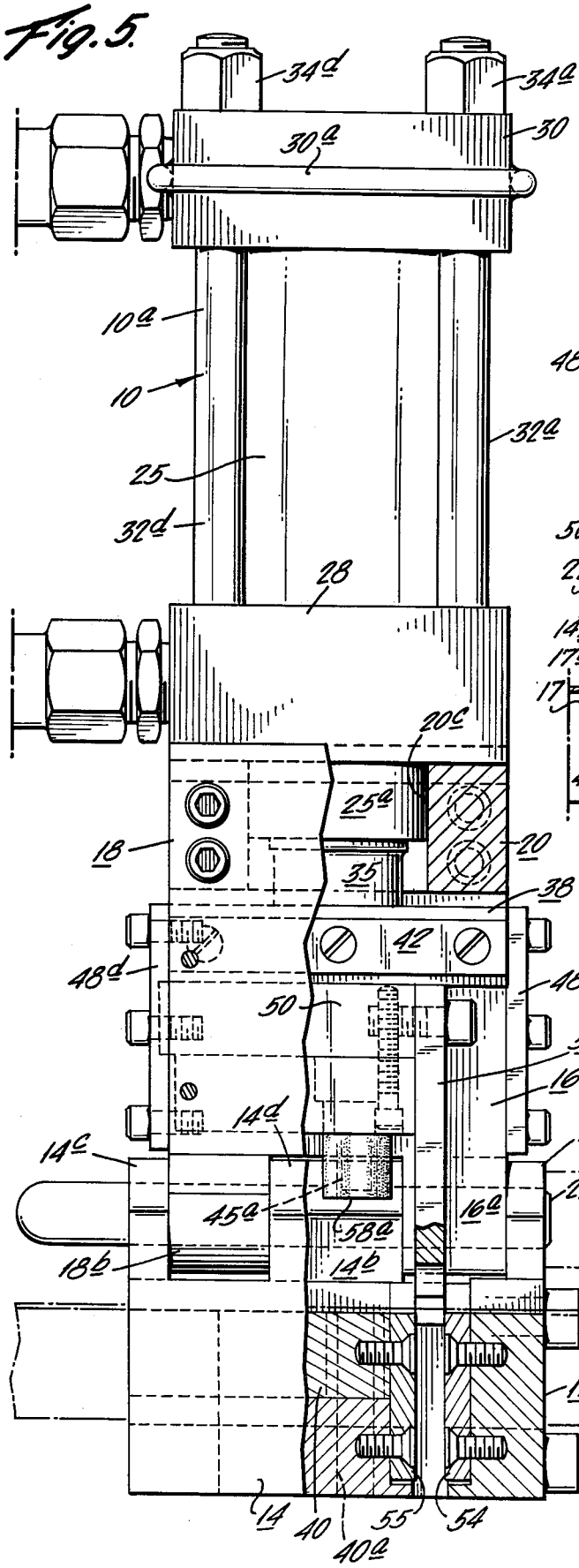
FIG. 5 is a front elevational view of the cutter and punch assembly with parts broken away showing details of the assembly.
Figure 6:
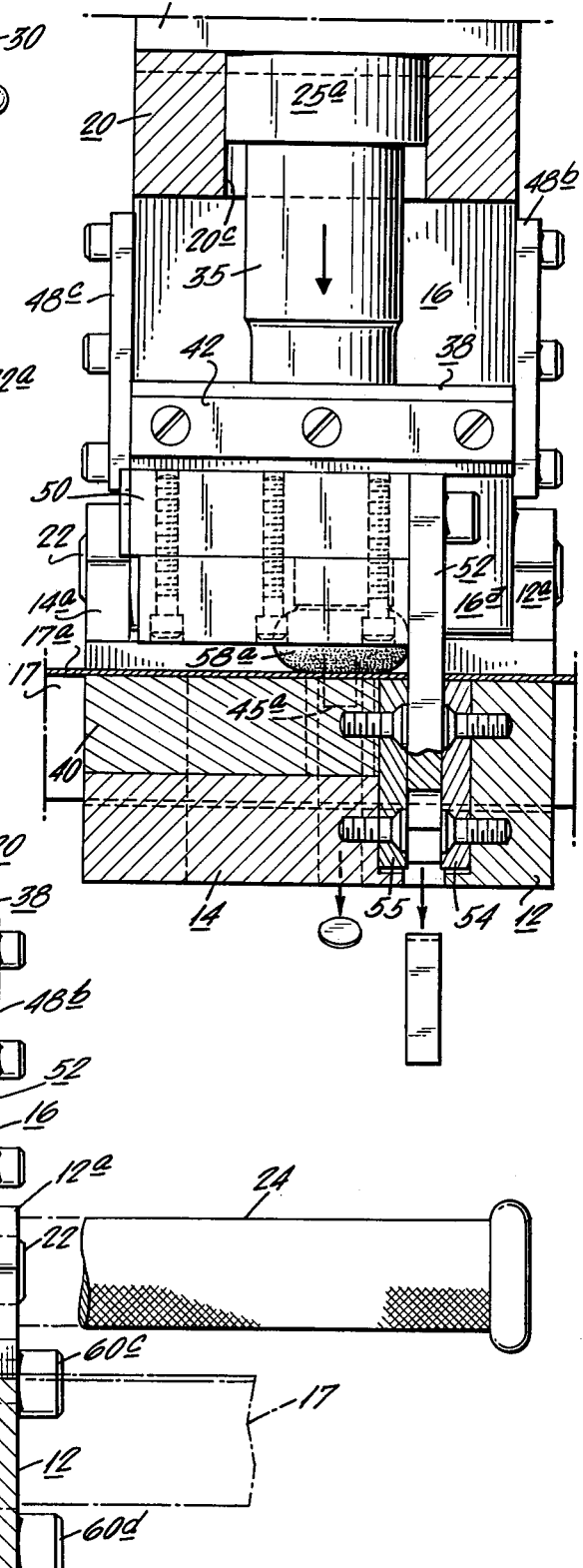
FIG. 6 is a fragmentary sectional front elevational view of the cutter and punch assembly showing the elements in a maximum stroke down position after cutting and punching.

From the rear assembly 10 (opposite to that shown in FIG. 2) front base member 12 has an upwardly extending lug member 12a and base member 14 has two upwardly extending lug members 14a,b. Lug members 12a, 14a,b form one portion of a hinge which snugly engages lower lug members 16a,b of an upwardly extending side tie plate 16. A hinge pin 22 secures together lug members 16a, 16b to upwardly extending lug members 12, 14a,b. Similarly, from the front of assembly 10 as shown in FIG. 5, there are provided lug members 12b extending from member 12 and lug members 14c,d extending from member 14 which engage to form a hinge with lug members 18a,b of an upwardly extending side tie plate 18. Locking pin 24 secures together lug members 18a,b with upwardly extending lug members 12b, 14c,d. Plates 16 and 18 are substantially flat and form the side supports for a cylinder mounting plate 20 which extends between the plates and within recess 18c of plate 18 and recess 16c of plate 16. Specifically, plate 20 has an extrusion 20a which fits within recess 16c and an extension 20b which fits within recess 18c.

Figure 4:
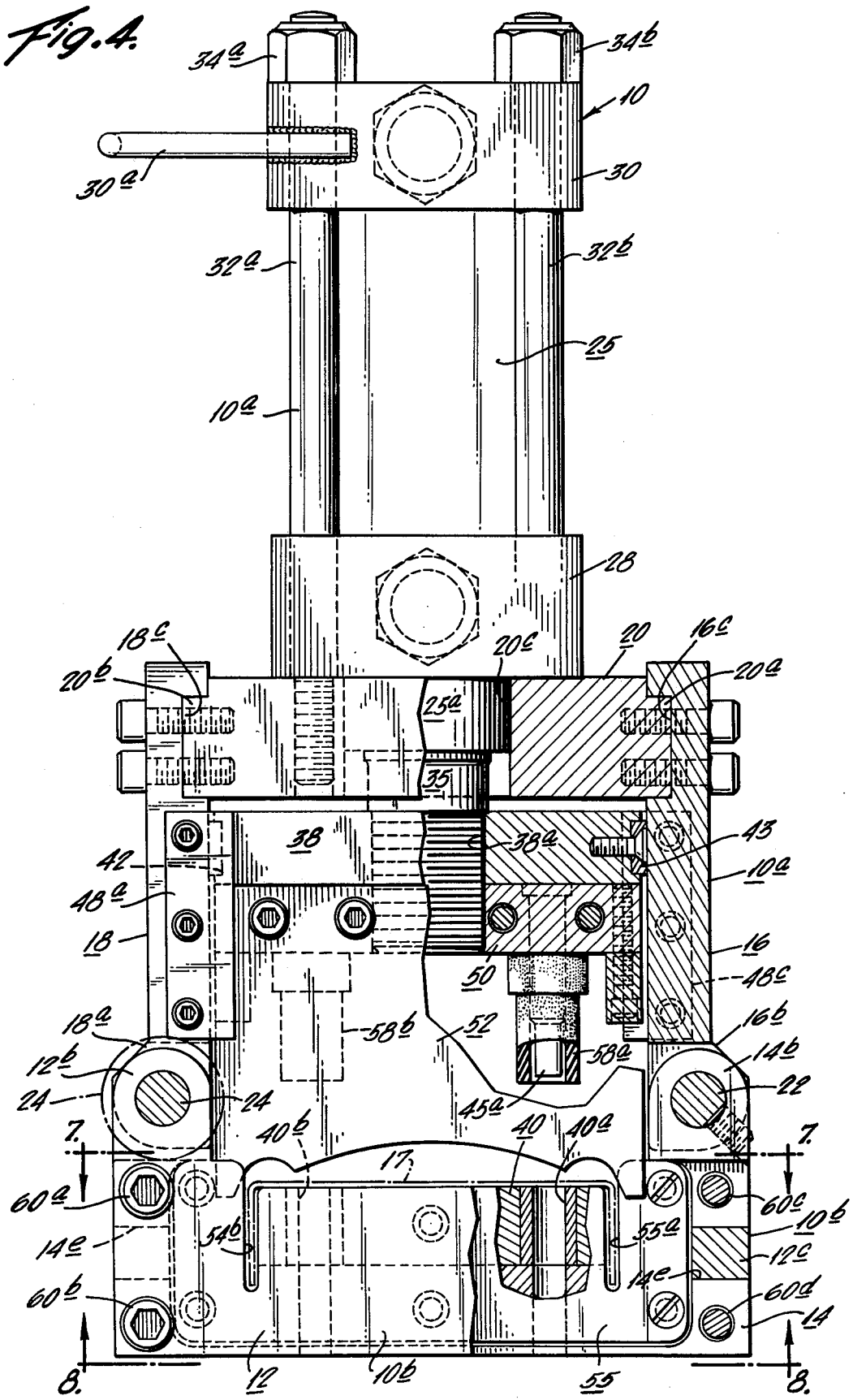
FIG. 4 is an enlarged right side elevational view of the cutter and punch assembly of FIG. 1 with portions broken away showing details of the assembly.

Plate 20 is rigidly secured in place within recesses 16c, 18c by eight Allen bolts which are received in respective openings in plates 16,18 and are threadedly received in respective extensions 20a,b of plate 20. As shown in FIG. 4, plates 16, 18 and 20 extend the full front dimension of assembly 10 (as well as the rear dimension thereof) and provide rigid support for hydraulic cylinder 25 and for the punching and cutting operation. In mounting cylinder 25, plate 20 has a centrally located bored hole 20c which snugly receives a lower bushing 25a of cylinder 25. Further, cylinder 25 has formed integrally therewith a bottom cylinder block 28 and a top cylinder block 30 which have openings for receiving four tie rods 32a–d which threadedly engage openings in cylinder mounting plate 20. The upper ends of tie rods 32a–d secure block 30 by means of respective locking nuts 34a–d. In this manner, cylinder 25 is fixedly secured in place with cylinder rod 35 extending downwardly through opening 20c and threadedly engages a central opening 38a of a ram plate 38.

Ram plate 38 is adapted to slide upwardly and downwardly with cylinder rod 35 and between side tie plates 16 and 18. In order to prevent rotation of plate 38 between the tie plates and to precisely guide plate 38 so that it is maintained straight with respect to a die bushing plate 40, there is provided a pair of side ram slides 42,43 respectively secured to the front and rear sides of plate 38. In this manner, slides 42,43 slidably engage inner surfaces of plates 18, 16 respectively to provide for the positive alignment of the punches 45a,b with respect to die bushing plate 40. Further, to restrict motion of ram 38, there is provided four retainers 48a–d which are secured to side plates 16,18. Specifically, retainers 48a,b are secured by means of bolts to plates 16,18 respectively, on a first side of assembly 10 and retainers 48c,d are secured by means of bolts to plates 16,18 respectively on a second side of the assembly. In this manner, the up and down reciprocating movement of ram plate 38 is further restricted and the plate is maintained in highly precise alignment to prevent the rotational movement.

As shown, a punch pad 50 is doweled and bolted to the bottom surface of ram plate 38 in conventional manner. As shown in FIG. 4, punch pad 50 does not extend fully to first side 11a provide adequate room for a vertically extending cutoff blade 52 as shown in FIG. 7. Blade 52 extends from the bottom surface of ram plate 38 downwardly to above cutoff inserts 54,55 in the full up stroke position. Inserts 54,55 are fixedly mounted to side sections of first and second base members 12 and 14 respectively. Thus, in cutting either channel 17a,b of cable tray 17, cutoff blade 52 is effective to cut by passing within inserts 54,55 thereby taking a slug out of the channel which slug then drops between the inserts downwardly.

Further, in conventional manner, punch pad 50 has reamed openings to receive downwardly extending punches 45a,b with each of the punches having Urethane strippers 58a,b respectively. Each of punches 45a,b is received within a respective die opening 40a,b of a die bushing plate 40. It will be understood that it is critical that punches 45a,b be correctly aligned with openings 40a,b to avoid possible shearing of the die steels. While this is important in any punch press, this is particularly important with respect to assembly 10 in view of its inherent small size and portable nature. Plate 40 is secured to an upper surface of second base member 14 and is aligned with insert 55. As a result, base member 14 is formed thinner than base member 12. Strippers 58a,b are used to hold down the channel after punching by punches 45a,b.

In operation, locking pin 24 is manually removed and upper section 10a of assembly 10 is pivoted open about hinge pin 22 until section 10a has its longitudinal axis at least horizontal or beyond horizontal, as shown. Accordingly, a portion of one channel 17a of cable tray 17 may then be placed within grooves 54a,b and 55a,b of respective inserts 54,55. Grooves 54a,b align with milled grooves in base members 12,14 respectively. As shown, plate 40 and base plate 14 may accommodate cable tray rungs of varying centers. It will be understood that cable trays may have their channel legs reversed from that shown so that the legs extend outwardly and inserts 54,55 would be suitably modified.

With channel 17a in position for cutting and punching, upper assembly section 10a is then rotated about hinge pin 22 to its illustrated operating position and locking pin 24 is inserted as illustrated.

Assembly 10 is now in position in the full up stroke. Thereafter, control valve 15a of assembly 15 may be actuated to apply fluid under pressure through hydraulic line 25a to cylinder 25. Accordingly, rod 35 is actuated thereby moving ram plate 38 and punch plate 50 downwardly to punch and cut channel 17a until the fully actuated down stroke position is reached as shown in FIG. 9. Thereafter, the control valve 15a is actuated to its opposite position to actuate cylinder rod upwardly to bring punch pad 50 and ram plate 38 to their illustrated uppermost up stroke position ready for the next cutting and punching operation.

In practice, after one channel section 17a has been cut and punched, locking pin 24 is again removed, the above operation repeated with section 10a pivoted and the cable tray 17 turned to insert the other channel 17b. The foregoing operation is repeated to cut and punch channel 17b directly opposite the first cut channel 17a.

Base section 10b is required to have a front and rear transverse dimension from first side 11a to second side 11b which is narrow enough to fit within support rungs of cable tray 17 even where these rungs are of close centers. Assembly 10 achieves this substantially narrow dimension while still maintaining proper support and rigidity of the assembly.

It will now be understood that cutter and punch assembly 10 is portable and of reduced size with effective cutting and punching force while still maintaining a rigid support structure for hydraulic cylinder 25 and for the cutting and punching operation. Assembly 10 achieves this weight and size reduction by means of a hinging and locking and unlocking assembly which allows section 10a to be tilted by a handle 30a to and below the horizontal and in this manner, provide for the insertion of cable tray 17. As a result, first and second sides 11a,b define the front and rear walls of a substantially open cutting and punching chamber which allows for the insertion of cable tray 17 and for the hinging operation but does not permit any structural support members in this open area. As shown in FIGS. 1, 2, safety shields 21a,b formed of sheet metal do close the first and second sides 11a,b but do not provide substantial support structure. While these features provide for the minimization of weight and size and for portability, they make more difficult the provision of the requirement of a rigid support structure without which the above described undesirable shearing of the punches causing burrs would take place.

Accordingly, the rigid support structure providing the required alignment is maintained by side tie plates 16,18 which are secured to cylinder mounting plate 20 by means of extensions 20a,b within recesses 16c, 18c respectively. Further, these tie plates 16,18 are rigidly secured to base section 10b by means of respective lug members and pins 22,24. In this manner, there is avoided lateral motion which would cause the above described adverse shearing of the punches.

What is claimed is:

1. A hydraulically actuated assembly for cutting and punching channels comprising
a base section, an upper hydraulically operated section pivotally secured to said base section having a first and a second member spaced from each other and defining the front and rear walls respectively of a cutting and punching chamber, said first and second members having upper recesses facing each other, a mounting member forming an upper wall of said chamber and rigidly secured within said recesses of said first and second members to form a rigid support structure, hydraulic cylinder means secured to said mounting member and extending into said chamber, and cutting and punching means secured to said hydraulic cylinder means for providing said cutting and punching of said channel within said chamber.

2. The hydraulically actuated assembly of claim 1 in which each of said first and second members have downwardly extending lug members, said base section have upwardly extending lug members associated with and engaging said lug members of said first and second members for defining a front hinge and a rear hinge, a locking pin for engaging said front hinge and a hinge pin for engaging said rear hinge whereby said locking pin may be removed to permit said upper section to be rotated about said rear hinge to allow insertion of said channel within said chamber.

3. The hydraulically actuated assembly of claim 1 or 2 in which said chamber has side walls not providing any substantial structural support and in which said first and second members are substantially flat plate members which together with said mounting member provides the only rigid support structure for said assembly.

4. The hydraulically actuated assembly of claim 3 in which said hydraulic cylinder means includes a hydraulically operated cylinder secured to an upper surface of said mounting member and having a cylinder rod extending through said mounting member.

5. The hydraulically actuated assembly of claim 4 in which said cutting and punching means includes punch pad means secured to said cylinder rod, a cutoff blade and punches secured to said punch pad means and insert blades for accommodating said cutoff blade secured to said base section and a die bushing plate secured to said base section for receiving said punches.

* * * * *